J. DAVIS.
Car Brake.

No. 43,010. Patented June 7, 1864.

Witnesses:
James J. Johnston
Alexander Hay

Inventor:
John Davis

UNITED STATES PATENT OFFICE.

JOHN DAVIS, OF ALLEGHENY CITY, PENNSYLVANIA.

IMPROVEMENT IN RAILROAD-CAR BRAKES.

Specification forming part of Letters Patent No. 43,010, dated June 7, 1864; antedated January 2, 1864.

*To all whom it may concern:*

Be it known that I, JOHN DAVIS, of Allegheny City, in the county of Allegheny and State of Pennsylvania, have invented a new and useful Improvement in Railroad-Car Brakes; and I do hereby declare that the following is a full and exact description thereof, reference being had to the accompanying drawings, and to the letters of reference marked thereon.

The nature of my invention consists in a combination and arrangement of levers, rods, and springs, which are so arranged and combined with brakes of railroad-cars that the moment that the locomotive ceases to draw the brakes are brought to bear with force on the wheels and relieved or taken off the wheels by the first drawing power of the locomotive, the whole being constructed, arranged, combined, and operating in the manner hereinafter described.

To enable others skilled in the art to make and use my invention, I will proceed to describe its construction and operation.

Figure 1:
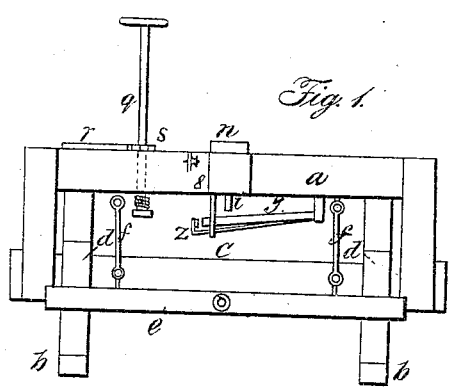
Figure 2:
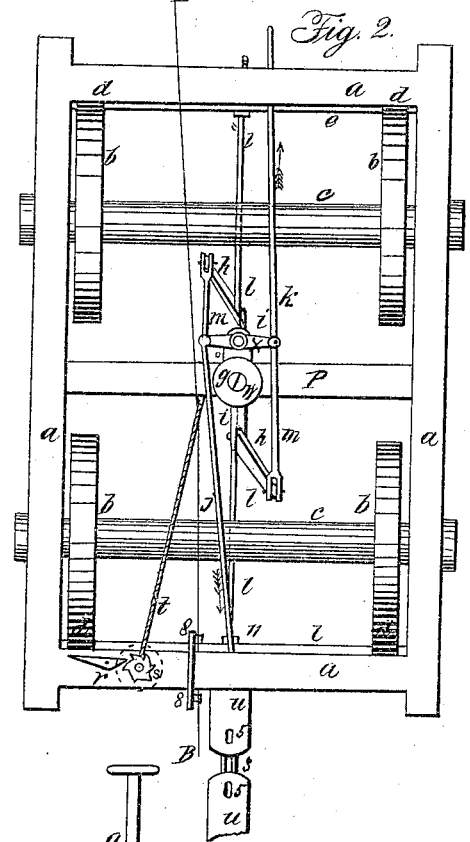
Figure 5:
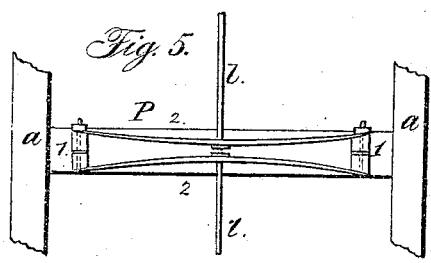
Figure 3:
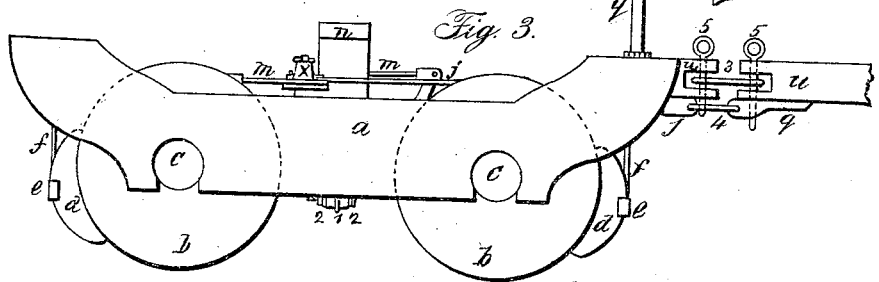
Figure 4:
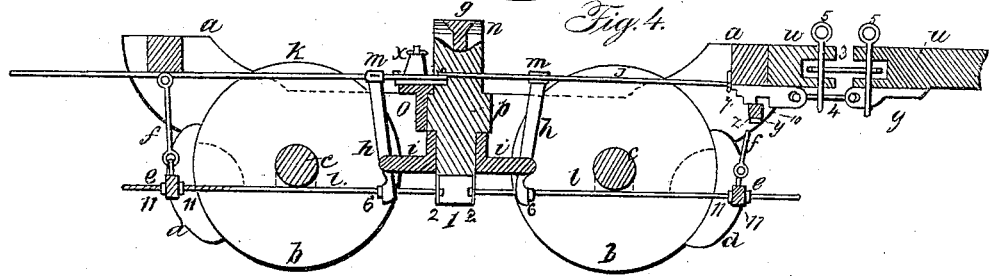

In the accompanying drawings, Figure 1 represents an end view of an ordinary car-truck furnished with my improvement. Fig. 2 represents a top view of the same. Fig. 3 represents a side view of the same. Fig. 4 represents a longitudinal section of the same. Fig. 5 is a broken section representing a bottom view of the bolster and the springs attached to it.

In the accompanying drawings, $a$ represents the frame of the truck. $b$ represents the wheels. $c$ represents the axles of the wheels $b$. $d$ represents the brakes. $e$ represents the brake-beams. $f$ represents the suspension-rods of the brakes and beams. $p$ represents the bolster.

The frame, wheels, axles, brakes, brake-beams, suspension-rods, and bolster are all constructed and arranged in the ordinary manner.

To the bolster $p$ are attached springs 2, the ends of which are held together by means of bolts and the division-pieces, marked 1. To the center of the springs are attached rods $l$, which pass through the brake-beams $e$. The ends of the rods, which pass through the beams $e$, are furnished with screw-threads and nuts, marked 11, which are used for the purpose of obtaining the desired tension and force of the springs 2 on the brakes $d$. The rods $l$ are also furnished with flanges 6, against which the short end of the levers $h$ act or press when throwing back the brakes from off the wheels $b$. The levers $h$ are attached to the pieces marked $i$, which are attached to the sides of the bolster $p$. To the upper or long end of the levers $h$ are attached rods $m$, which are attached to the vibrating lever $x$, which is attached to the piece marked $o$, which also is secured to the bolster $p$. To the lever $x$ are also attached rods $j$ and $k$. The rod $j$ is furnished with a projection, 7, and a notch, 10, which are used in connection with the catch $y$ for holding the brakes in a fixed position when so desired. The catch $y$ is furnished with a spring, on the end of which is placed a pulley, which is used in connection with the pulleys 8 for the cord B, which is used for the purpose of operating the catch $y$.

The spring $z$ is used for taking up the slack of the cord B, which passes over the pulleys 8 and under the pulley on the end of the spring $z$.

The arrangement of the spring $z$ and its pulley and the catch $y$ and its attachment to the frame of the truck is clearly shown in Fig. 1.

$q$ represents an ordinary hand-lever, which is used in connection with the pall and ratchet $r$ and $s$, for operating the brakes by hand-power. To the lower end of the hand-lever $q$ is attached the rope $t$, which is also connected to the rod $j$, which is connected by means of link 4 to the piece marked 9 on the coupling $u$ of the locomotive or the next car.

$w$ represents the ordinary swivel-plate of the bolster $p$, and is held in position by means of the screw-bolt $g$.

3 represents the ordinary coupling-link, and is made longer than link 4, so that the first action of the locomotive will be to draw on the rod $j$, and thereby "take off the brakes."

5 represents coupling-pins.

I wish it clearly understood that I do not confine myself to any particular size or form of the various parts connected with my invention. These things I leave to the skill and desire of the mechanic, or those who may use my improvement.

The operation of my invention is as follows: Having all things constructed, arranged, and combined as herein described and represented, I then set the springs 2 by means of the screw-nuts 11, so as to get the desired pressure of the brakes on the wheels. The forward motion of the locomotive will first draw on link 4, which will draw the long end of the levers $h$ toward the center of the truck. This will cause the short end of the levers to press against the flanges 6 on the rods $l$, which will force back the beams $e$ and brakes $d$ from off the wheels $b$. If I desire to hold the brakes off the wheels, I draw off the catch $y$ by means of cord B, so that it will come up back of the projection 7 on the rod $j$, and if I desire to hold the brakes on, so as to overcome the momentum of the locomotive when stopping the train, the catch $y$ is then drawn up into notch 10, in rod $j$. When I wish to "take the brakes off" by hand-power, I turn the hand-lever $q$, which will wind up the chain $t$, which will move the levers $h$ and $x$ in the desired direction for relieving the brakes from the wheels $b$.

It will be observed that the operation of my improvement in brakes is the reverse of those in common use—that is to say, "to put the brakes on" I slacken up the chains or rods and the levers. In common practice they are drawn or wound up. To take the brakes off, I draw the chains or rods up. The common practice is to slacken them up.

Having thus described the nature, construction, and operation of my improvement, what I claim as of my invention is—

The use of rods $j$, $k$, $l$, and $m$, levers $h$ and $x$, springs 2, and catch $y$, or their equivalents, when used in combination with brakes, which are operated substantially in the manner herein described, and for the purpose set forth.

JOHN DAVIS.

Witnesses:
   JAMES J. JOHNSTON,
   ALEXANDER HAYS.